United States Patent

[11] 3,626,404

[72] Inventors David Ophir
East Patchogue, N.Y.;
Barry J. Shepherd, San Jose; Robert J. Spinrad, Santa Monica, Calif.

[21] Appl. No. 797,765
[22] Filed Feb. 10, 1969
[45] Patented Dec. 7, 1971
[73] Assignee The United States of America as represented by the United States Atomic Energy Commission

[54] THREE-DIMENSIONAL DISPLAY SYSTEM
1 Claim, 2 Drawing Figs.

[52] U.S. Cl. .......... 340/324 A, 178/6.5, 178/6.6 DD, 178/6.8
[51] Int. Cl. .......... G06f 3/14
[50] Field of Search .......... 340/324.1; 178/6.5, 6.8, 6.6 DD

[56] References Cited

UNITED STATES PATENTS

| | | | |
|---|---|---|---|
| 3,165,578 | 1/1965 | Lauricella | 178/6.5 |
| 3,448,208 | 6/1969 | Chisnell et al. | 178/6.5 |
| 3,457,364 | 7/1969 | Carrillo | 178/6.5 |
| 3,396,377 | 8/1968 | Strout | 340/324 |

*Primary Examiner*—John W. Caldwell
*Assistant Examiner*—Marshall M. Curtis
*Attorney*—Roland A. Anderson

ABSTRACT: Interactive method and apparatus for producing three-dimensional television wherein means having a computer and stored program device feeds a standard television monitor with two separate signals to produce a stereographic display in different colors that can be viewed through separate colored filters for three-dimensional television viewing by a large number of people.

INVENTORS.
DAVID OPHIR
BARRY J. SHEPHERD
ROBERT J. SPINRAD
BY

THREE-DIMENSIONAL DISPLAY SYSTEM

CROSS-REFERENCE TO RELATED APPLICATIONS

The subject matter disclosed in U.S. Pat. application S.N. 797,766 now abandoned, Spinrad et al., entitled "Display System" and filed concurrently herewith is related to the subject matter disclosed herein

BACKGROUND OF THE INVENTION

A widespread interest in graphic terminals with particular emphasis on improved man-machine interaction has encouraged many important developments in both hardware and software. Many situations can presently be satisfied with an interactive "electronic typewriter" terminal on which alphanumeric and graphic information can be displayed. However, those applications in which it is desirable to display images in three dimensions have had to tolerate limited or indirect methods of display.

One of the more popular methods to cope with the three-dimensional problem is to present the image in simple perspective. This can be a fairly satisfactory way to display a three-dimensional surface. However, even by adding texture to the perspective, the display still fails to give a convincing three dimensional image of the object perceived. Accordingly, an interactive apparatus and method have been desired for providing a convincing three-dimensional display.

SUMMARY OF THE DISCLOSURE

In accordance with this invention, an interactive three-dimensional image is produced using a raster display of two perspective images on a cathode ray tube screen, with separation of the optical channels between the left and right images and the left and right eyes being obtained by color separation. More particularly, in one embodiment, this invention, comprises means having an interactive computer for calculating two perspective images, a refresh drum for storing the computerized perspective images in binary form, a converter for converting the stored binary information to video signals for each image, a color television monitor for converting the two video signals into respective overlapping, different, color, raster displays of the two video signals, and filters for the respective color raster displays for viewing in three dimensions by one or more viewers. With the proper selection of components and steps, as described in more detail hereinafter, convincing three-dimensional images and viewing are obtained.

The above and further novel features and objects of this invention will be understood in more detail from the following description when the same is read in connection with the accompanying drawings. It is to be expressly understood, however, that the drawings are not provided as a definition of the invention but are the purposes of illustration only.

The invention described herein was made in the course of, or under a contract with the U.S. Atomic Energy Commission.

DETAILED DESCRIPTION OF THE PREFERRED EMBODIMENT

This invention is useful in providing convincing three-dimensional images of substantially any still or moving object or display for a wide variety of applications and uses. A partial list of uses and applications in no way exhaustive of those possible in accordance with this invention, for example, comprises the convenient three-dimensional viewing of crystals for study, illustration, education, communication, investigation or even discovery, such as actually illustrated on page 81 of the Brookhaven National Laboratory report number BNL 50106 (AS-22 ), dated July 1, 1968 and published in Dec. 1968. Likewise, simple or complex mechanical objects can be viewed in convincing three-dimensional images, as illustrated on page 55 of the same above-cited BNL report. Additional uses and applications in accordance with this invention, are still or moving three-dimensional views of airplane positions for air traffic controller consoles, or still or moving images for standard commercial or closed circuit television viewing for purposes of education, entertainment or advertising.

A standard commercial color television monitor having at least two different color inputs can be used in accordance with this invention. Also, suitable sets of red-green filters having a suitable color separation between the filters to provide one red filter for one eye and one green filter for the other eye of each individual viewer are used in accordance with this invention. For example, Wratten number 29 and 61 red and green filters are suitable in accordance with this invention for matching commercial color TV tube rare earth phosphors. Likewise standard computers, refresh storage drums and binary to video converters for feeding the required signals into the two different color inputs of the standard color television are used in accordance with this invention.

Figure 1:
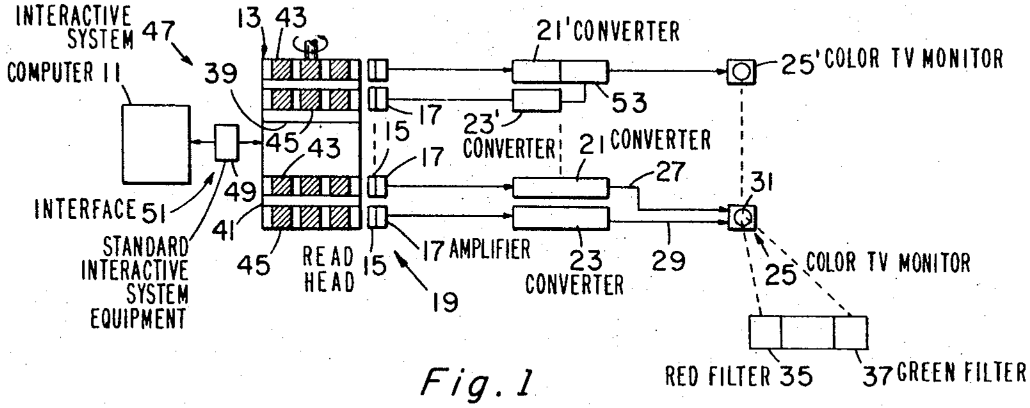
FIG. 1 is a partial schematic drawing of the apparatus of this invention.

As illustrated in FIG. 1, the apparatus and display technique used is that of programmatically generating a binary image of the two desired perspective pictures in computer 11, transferring this bit pattern onto a rotating drum memory 13, and continuously displaying from it via independent read heads 15. The image is formed in a manner directly analogous to that of any standard television picture with swept horizontal lines. To this end, allowance is made for the necessities of line retrace and frame interlace. Also, the binary string is transmitted to the drum 13 as a sequence of computer words and the drum is so arranged that one complete revolution stores the complete perspective pictures.

A read amplifier 17 per head 15 is supplied in the drum assembly 19. These provide a continuous readout of the bit pattern of the display. The output signals from amplifier 17 are appropriately converted into video signals in converters 21 and 23 and fed directly to a standard color TV monitor 25 through a respective red input 27 and a green input 29 for display on the cathode ray tube 31 of the monitor 25 and viewing through red filter 35 and green filter 37.

Synchronizing signals are taken from a clock 39 on the drum 13. With the drum rotating at 1,800 R.P.M., this arrangement provides the American Standard interlaced 30 frames per second refresh rate. The displayed images have a resolution of 512×512 points. The resulting picture is crisp and clear because of the picture elements are produced automatically in perfect registration with the TV lines, and the "-venetian blind" effect commonly found between TV camera and TV monitor does not exist.

Since the mapping of the point, line, and characteristic information into the video format is an onerous computational task, a reasonably powerful computer is required to insure adequate response times. One suitable computer, for example, requires 0.28 sec. to generate a 4,000 character display, and 0.8 sec. to build a display of 12,000 unrelated points. A more powerful computer, which is also suitable, requires 0.14 sec. for the character display and 0.3 sec. for the point display based on a working memory size of 12,000 words and the necessary drum access time.

In the operation of one embodiment of this invention reduced to actual practice, reference is made to FIG. 1, wherein computer 11 for calculating the required information for conversion to video signals for transmission through red input 27 and green input 29 of color television monitor 25, is advantageously an SDS Sigma 7. This computer allows for the programmed storage of the desired pictorial information to be displayed by storing of the desired information on a rotating drum surface 41 as a binary (one-zero) map whereby the map is transmitted to the cathode ray tube (CRT) 31 of the color television (TV) monitor 25 as drum 13 rotates. The mode of storage is such that the binary information elements modulate the beam intensity in a standard TV-type raster to reproduce the two desired perspective images on CRT 31.

To produce two satisfactory perspective images on one CRT 31 in the embodiment described herein, 262,000 (512×512) binary picture elements are stored on the drum "-swath" for each image, i.e., two drum swaths 43 and 45 are required for the two inputs of the color TV monitor 25. In this regard, a swath is defined as that group of drum tracks that are necessary to contain the complete binary map of the single CRT face 31. Also, the system advantageously uses the minimum number of tracks per swath to obtain a reliable picture.

The swaths 43 and 45 are divided into 512 sectors. Thus, each sector defines one horizontal sweep line consisting of 512 bright or dark points. Space is allotted on the drum between the sectors to allow the CRT beam to "flyback" preparatory to the start of the next sweep line. At the end of both the 256th and the 512th sectors, enough space is allotted on the drum 13 to allow for both the horizontal and vertical beam-repositioning times. In the practical embodiment described herein, the raster image is generated in an "interlaced" mode, comprising first, the odd-numbered (1,3,5,7...511) horizontal sweeps, and then the even-numbered (2,4,6,8...512) horizontal sweeps are interlaced therewith.

Advantageously, since the drum 13 rotates at 1,800 r.p.m. through suitable standard connections with a synchronous motor a display of 30 frames per second is produced without hum. This makes possible the use with each drum swath of a set of standard reading heads 15, amplifiers 17 and shift registers in converters 21 and 23 for producing from the stored information, video signals appropriate for driving each input, comprising the red input 27 and the green input 29 for a standard commercial 19 or 21-inch TV monitor 25, although any screen size will do.

The swaths are capable of being read into or out of the drum 13 whereby the computer 11 practically and adjustably supplies to the drum 13 the request along with the swath and sector number to form an adjustable, variable picture size in an interactive system 47 in accordance with this invention. To this end, for ease of operation, the interactive system 47 of this invention provides standard equipment 49 that enables the operator-programmer manually to resolve and/or position a spot, or mark, anywhere in the display field of the CRT 31. Also, the position of this spot (i.e., the scan line number and displacement along the scan) is made available in digital form at the interface 51 of system 47.

For ease of operation the interface 51 to computer 11 enables the use of the system 47 by addressing any sector on the drum without having to suffer any delay greater than that due to the wait for the selected sector to appear at the read heads 15 for the first time. This also is helpful in providing interconnecting cables to allow for operation of the monitor 25 at any preselected locations, e.g., at distances from 100 to 1,000 feet from the display drum 13, although the monitor can be closer than 100 feet.

Figure 2:
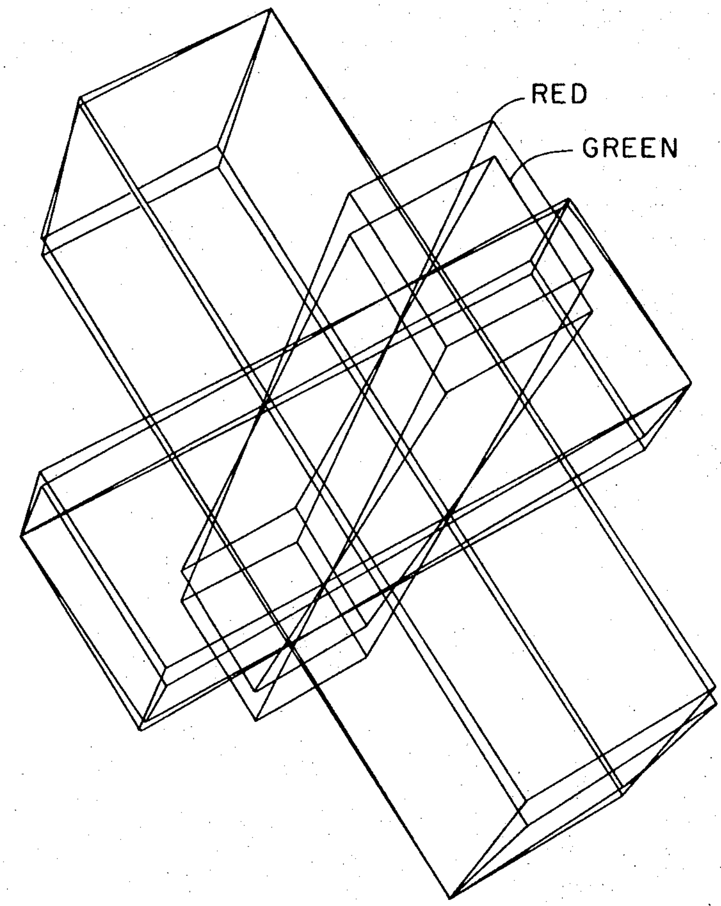
FIG. 2 is a partial three-dimensional view in black and white of the two-color overlapping perspective images displayed on the color television monitor of FIG. 1 in accordance with this invention.

In producing the stereographic display, the computer 11 calculates the projected images of the object from two separated points. The two resulting video maps are written in separate refresh swaths 43 and 45 on the drum 13 and the output signals are connected to the red input channel and the green input channel of monitor 17, through suitable connections, comprising inputs 27 and 29. A typical black and white representation of the separate displays produced by the system 47 is shown in FIG. 2 wherein the system interactive response time is less than 1 second.

General purpose software packages for programming the computer 11 are commercially available and/or are well within the skill of the programming art. One suitable commercially available perspective drawing package for example, is the "Calcomp Three D" perspective drawing software package available from California Computer Products, Inc., Dept. D-11, 305 N. Muller St., Anaheim, California. Likewise, the "Fortran Thermal-Ellipsoid Plot Program For Crystal Structure Illustrations," described in ORNL 3,794 can be used in accordance with this invention.

The software package is applied to each perspective view corresponding to the image to be seen by each eye of the object for display. To this end one perspective view for one eye, e.g., the right eye, is calculated in computer 11 for storage and refreshing in swath 43 on drum 13 for transmission to monitor 25 through the red input 27, and the other corresponding perspective view for the other eye, i.e., the left eye, is calculated in computer 11 for storage and refreshing in swath 45 on drum 13 for transmission to monitor 25 through the green input 29. The result, when the appropriate red and green filters 35 and 37 are interposed between the monitor 17 and the respective right and left eyes of the viewer, is a convincing three-dimensional view of one object corresponding to the display on the CRT 31 of the monitor 25.

As described in the above-cited BNL report, three-dimensional displays are particularly striking when the two stereo projections of the object are generated by the interactive raster display system of this invention based on a computer presentation that superimposes the lines of the object to be viewed on a bright field. However, as illustrated in this above-cited report the red and green lines are normally displayed in an overlapping configuration on a dark background. These alternative backgrounds are provided by simple program changes.

While this invention has been described with reference to an interactive closed circuit TV system, it will be understood that the system of this invention can be used in connection with remote TV broadcasting and reception. To this end the output from converters 21' and 23' are broadcast with suitable broadcast equipment, such as broadcasting components 53 well known in that art for remote reception by one or more monitors 25' for remote viewing by a still larger number of persons than the described system.

It will also be understood that, while this invention has been described with reference to a standard commercial television monitor having a composite driving signal, any color cathode ray tube having any other driving mechanism, such as an $x$–$y$ coordinate plotter, may be used in accordance with this invention to produce convincing three-dimensional displays.

This invention has the advantage of effectively providing a practical convincing, and interactive three-dimensional TV display system. Moreover, this invention provides an innovation that has actually been reduced to practice and that can be immediately implemented on a wide scale with minimal effort in time, cost and labor.

What is claimed is:

1. The method of selectively producing interactive computer displays in three-dimensional depth independently of the operation of a computer, comprising the steps of separately and selectively computing and continuously storing binary data maps of said displays, selectively converting said stored binary data maps into separate, overlapping, perspective, video signals, and selectively, repeatedly displaying said maps in a continuous perspective and overlapping manner on a color television monitor in accordance with said converting of said stored binary data maps and independent of said computer operation.

* * * * *